(12) United States Patent
Winn

(10) Patent No.: US 10,140,390 B1
(45) Date of Patent: Nov. 27, 2018

(54) DELETION BLOCKING MODULE FOR A MULTI-USER CAX ENVIRONMENT

(71) Applicant: United Technologies Corporation, Farmington, CT (US)

(72) Inventor: Joshua Daniel Winn, Ellington, CT (US)

(73) Assignee: United Technologies Corporation, Farmington, CT (US)

( * ) Notice: Subject to any disclaimer, the term of this patent is extended or adjusted under 35 U.S.C. 154(b) by 282 days.

(21) Appl. No.: 15/134,914

(22) Filed: Apr. 21, 2016

(51) Int. Cl.
  *G06F 17/50* (2006.01)
  *H04L 29/08* (2006.01)
  *H04L 12/24* (2006.01)

(52) U.S. Cl.
  CPC .............. *G06F 17/50* (2013.01); *H04L 41/20* (2013.01); *H04L 67/10* (2013.01)

(58) Field of Classification Search
  CPC ...................................................... G06F 17/50
  USPC ............................................................ 703/1
  See application file for complete search history.

(56) References Cited

U.S. PATENT DOCUMENTS

| | | |
|---|---|---|
| 8,229,715 B1 | 7/2012 | Teller et al. |
| 2013/0144566 A1 | 6/2013 | De Biswas |
| 2014/0149882 A1 | 5/2014 | Nysetvold et al. |
| 2014/0222387 A1 | 8/2014 | Cannon et al. |
| 2014/0222919 A1 | 8/2014 | Nysetvold et al. |
| 2014/0236550 A1 | 8/2014 | Nysetvold et al. |

OTHER PUBLICATIONS

Xu, Yue, A Flexible Context Architecture for a Multi-User GUI, Thesis, Dec. 2010, Department of Mechanical Engineering, Brigham Young University.
Red, Edward, David French, Ammon Hepworth, Greg Jensen, and Brett Stone, Multi-User Computer-Aided Design and Engineering Software Applications, Cloud-Based Design and Manufacturing (CBDM), Jan. 1, 2014, pp. 25-62, Springer International Publishing.
Red, Edward, Greg Jensen, Jordan Ryskamp, and Kenneth Mix, NXConnect: Multi-User CAx on a Commercial Engineering Software Application, Department of Mechanical Engineering, Brigham Young University. 2010 PACE Global Annual Forum.
European Search Report for Application No. 17161521.4 dated Sep. 6, 2017.

(Continued)

*Primary Examiner* — Timothy A Mudrick
(74) *Attorney, Agent, or Firm* — Carlson, Gaskey & Olds, P.C.

(57) ABSTRACT

A system for executing agnostic multi-user CAx environments includes a host computer including a processor and a memory. The processor and memory are configured to operate a multi-user CAx environment. The host computer is configured to communicate with a plurality of local computers, each of the local computers including at least one CAx software package and being configured to operate a local CAx environment of the multi-user CAx environment. A feature list is stored within the memory of the host computer, the feature list includes a list of each feature of a part file. A deletion prevention module is stored within at least one of the memory of the host computer and a memory of each of the local computers. The deletion prevention module is configured to prevent deletion of a prior feature currently accessed by at least one local CAx environment.

16 Claims, 5 Drawing Sheets

(56) References Cited

OTHER PUBLICATIONS

Hepworth, Ammon I., Conflict Management and Model Consistency in Multi-user CAD (PhD Thesis), All Theses and Dissertations, Paper 5586, Aug. 1, 2014 (Aug. 1, 2014), Retrieved from the Internet: URL:http://scholarsarchive.byu.edu/cgi/viewcontent.cgi?article=6585&context=etd.

Hepworth, Ammon I., et al., Automated Conflict Avoidance in Multi-user CAD, Computer-Aided Design and Applications, vol. 11, No. 2, Oct. 30, 2013 (Oct. 30, 2013), pp. 141-152.

Moncur, Robert A., et al., Data Consistency and Conflict Avoidance in a Multi-User CAx Environment, Computer-Aided Design and Applications, vol. 10, No. 5, Aug. 9, 2013 (Aug. 9, 2013), pp. 727-744.

DELETION BLOCKING MODULE FOR A MULTI-USER CAX ENVIRONMENT

BACKGROUND

This disclosure relates to computer-aided technologies (CAx), and more particularly, to visualization of component designs in a computing environment.

CAx software is used to develop tools, parts, assemblies, structures and other components using a computer system during the design, analysis, and manufacturing phases, for example. CAx software may be used by a user or group of users to build, analyze, and manufacture complex elements. CAx software is typically restricted to a single user paradigm, wherein only a single user can edit a model or part file within a CAx software application at a time. The user must exit the file before another user is allowed to access it.

SUMMARY

In one exemplary embodiment a system for executing agnostic multi-user CAx environments includes a host computer including a processor and a memory, the processor and memory configured to operate a multi-user CAx environment, the host computer configured to communicate with a plurality of local computers, each of the local computers including at least one CAx software package and configured to operate a local CAx environment of the multi-user CAx environment, a feature list stored within the memory of the host computer, the feature list including a list of each feature of a part file, and a deletion prevention module stored within at least one of the memory of the host computer and a memory of each of the local computers, the deletion prevention module configured to prevent deletion of a prior feature currently accessed by at least one local CAx environment.

In another exemplary embodiment of the above described system for executing agnostic multi-user CAx environments the prior feature is a feature accessed in at least one of the local CAx environments.

In another exemplary embodiment of any of the above described systems for executing agnostic multi-user CAx environments the feature deletion prevention module includes a list of each feature currently accessed by one of the local computers, and wherein the host computer is configured to prevent any deletion of a feature on the list.

In another exemplary embodiment of any of the above described systems for executing agnostic multi-user CAx environments the feature deletion prevention module is configured to cause the host computer to poll each local CAx environment and determine a currently active feature in each of the local CAx environments in response to a feature deletion request.

In another exemplary embodiment of any of the above described systems for executing agnostic multi-user CAx environments the feature deletion prevention module is further configured to cause the host computer to prevent deletion of any currently active feature.

In another exemplary embodiment of any of the above described systems for executing agnostic multi-user CAx environments the deletion prevention module is further configured to prompt each local CAx environment accessing the prior feature in response to the feature deletion request.

In another exemplary embodiment of any of the above described systems for executing agnostic multi-user CAx environments the prompt includes an option for a local user accessing the prior feature to allow the prior feature to be deleted.

In another exemplary embodiment of any of the above described systems for executing agnostic multi-user CAx environments the local CAx environment of the local user is configured to cause the local CAx environment to change an accessed feature to a feature having an earlier time stamp than the prior feature in response to the local user allowing the prior feature to be deleted.

In another exemplary embodiment of any of the above described systems for executing agnostic multi-user CAx environments a feature is defined as at least one of a geometric operation, a non-geometric operation, a result of a geometric operation, and a result of a non-geometric operation.

In another exemplary embodiment of any of the above described systems for executing agnostic multi-user CAx environments the feature list is a chronologically ordered list, and wherein each feature includes a timestamp.

An exemplary method for preventing system instability in a multi-user CAx system includes receiving a requested operation at a deletion prevention module, the requested operation including a requested deletion of at least one feature of an ordered feature list of a CAx part file, determining if the at least one feature of a CAx part file is currently accessed by at least one local CAx environment, and the deletion prevention module preventing the requested operation in response to determining that at least one local CAx environment is accessing the at least one feature.

In a further example of the above described exemplary method for preventing system instability in a multi-user CAx system determining if the at least one feature of the CAx part file is currently accessed by at least one local CAx environment comprises comparing the at least one feature against a list of features currently being accessed, the list of features currently being accessed being stored in a host computer CAx environment.

In a further example of any of the above described exemplary methods for preventing system instability in a multi-user CAx system determining if the at least one feature of the CAx part file is currently accessed by at least one local CAx environment comprises a host CAx environment polling each connected local CAx environment and comparing the at least one feature against a feature currently being accessed by each at least one local CAx environment.

In a further example of any of the above described exemplary methods for preventing system instability in a multi-user CAx system the requested deletion of at least one feature of a CAx part file is a requested deletion of a feature off a feature list, and wherein the feature list is an ordered list of geometric operations, non-geometric operations, results of geometric operations, and results of a non-geometric operations.

Another example of any of the above described exemplary methods for preventing system instability in a multi-user CAx system further includes prompting a user accessing the at least one feature in response to determining that the at least one feature of a CAx part file is currently accessed by at least one local CAx environment, wherein the prompt includes at least information identifying the requested operation.

In a further example of any of the above described exemplary methods for preventing system instability in a multi-user CAx system the prompt further includes an override option, and wherein the deletion prevention module allows deletion of the at least one feature in response to an override authorization.

In a further example of any of the above described exemplary methods for preventing system instability in a multi-user CAx system the local CAx environment accessing the at least one feature reverts to a feature of the ordered feature list earlier than the at least one feature in response to the override authorization, thereby allowing deletion of the at least one feature.

The various features and advantages of this disclosure will become apparent to those skilled in the art from the following detailed description. The drawings that accompany the detailed description can be briefly described as follows.

BRIEF DESCRIPTION OF THE DRAWINGS

The various features and advantages of the disclosed embodiments will become apparent to those skilled in the art from the following detailed description. The drawings that accompany the detailed description can be briefly described as follows.

DETAILED DESCRIPTION

Figure 1:
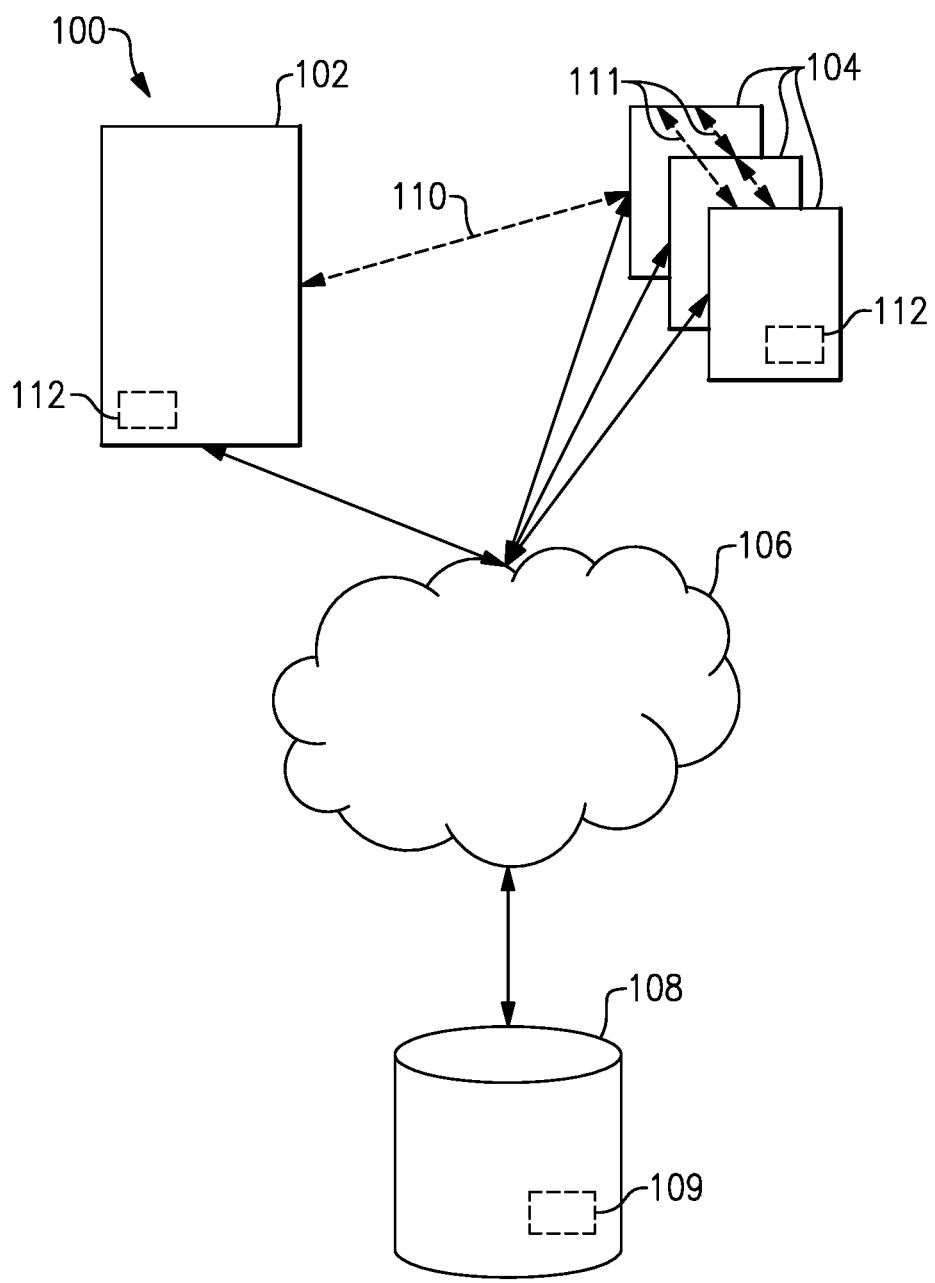
FIG. 1 illustrates a system for a multi-user CAx environment, according to an embodiment.

FIG. 1 illustrates an embodiment of a computing architecture or system 100 for executing a multi-user CAx environment, according to an embodiment. The system 100 includes a host computer 102. The host computer 102 may include one or more of a computer processor, memory, storage means, network device, and input and/or output devices and/or interfaces. The host computer 102 is configured to execute one or more software programs. In one embodiment, the host computer 102 is more than one computer jointly configured to process software instructions serially or in parallel.

In some embodiments, the host computer 102 is in communication with one or more networks such as a network 106 comprised of one or more computing devices. The system 100 additionally includes one or more client computers 104. The host computer 102 and the one or more client computers 104 typically include one or more of a computer processor, memory, storage means, network device and input and/or output devices and/or interfaces according to some embodiments. The memory may, for example, include UVPROM, EEPROM, FLASH, RAM, ROM, DVD, CD, a hard drive, or other computer readable medium which may store data and/or the CAx software of this description. The host computer 102 and the one or more client computers 104 may be a desktop computer, laptop computer, smart phone, tablet, or any other computer device. In some embodiments, one or more of the host computer 102 and the one or more client computers 104 include an input device, such as a keyboard and mouse, and one or more output devices such as a monitor, speakers, printers, etc. The interface facilitates communication with the other systems and/or components of the network 106.

In some embodiments of collaboration between multiple CAx users, each of the client computers 104 is a user workstation capable of accessing and locally running CAx software and providing a CAx environment 112. In some embodiments, the CAx environment 112 is operable to perform one or more CAx functions including at least one CAx tool, including a computer-aided design (CAD), computer-aided engineering (CAE) and/or computer-aided manufacturing (CAM) tool, for example. In other embodiments, at least one of the client computers 104 is operable to execute different CAx functions. In some embodiments, the CAx environment 112 provides a display or visualization of a component design stored one or more part files, according to one or more visualization settings, and can be provided via one or more graphical user interfaces (GUI).

In some embodiments, the one or more client computers 104 are configured to communicate with the host computer 102 directly via a direct client interface 110 or over the network 106. The one or more client computers 104 are configured to execute one or more software programs, such as a CAx package. In some embodiments, the CAx package is configured to communicate with the host computer 102 either over the network 106 or directly through the direct client interface 110. In another embodiment, the one or more client computers 104 are configured to communicate with each other directly via a peer-to-peer interface 111.

The network 106 may be a private local area network (LAN), a private wide area network (WAN), the Internet, a mesh network, or any other network as is known in the art. The system 100 additionally includes at least one storage system 108, which in some embodiments is operable to store or otherwise provide data to other computing devices. In one embodiment, the storage system 108 is a storage area network device (SAN) configured to communicate with the host computer 102 and/or the one or more client computers 104 over the network 106. In another embodiment, the storage system 108 is located within the host computer 102 or within at least one of the client computers 104. The storage system 108 may be configured to store one or more of computer software instructions, data, CAx files, database files, configuration information, etc.

In some embodiments, the system 100 is a client-server architecture configured to execute computer software on the host computer 102, which is accessible by the one or more client computers 104 using either a thin client application or a web browser executing on the one or more client computers 104. In some embodiments, the host computer 102 loads the computer software instructions from local storage, or from the storage system 108, into memory and executes the computer software using the one or more computer processors.

In some embodiments of the multi-user CAx architecture, each part file is stored within a database 109 at a central location, for instance at storage system 108. In another embodiment, the database 109 is stored at host computer 102 or is a distributed database provided by one or more of the client computers 104. In some embodiments, the database 109 is a relational database, and each part file in the database 109 is associated with a sub-assembly or assembly. In some embodiments, the database 109 is linked or otherwise corresponds to multiple part files. In an embodiment, the database 109 is configured to store data corresponding the component design one or more database records or entries, rather than linking or otherwise associating one or more part files to the database 109.

Each part file comprises one or more features, each feature corresponding to one or more feature types discussed below. In some embodiments, the part file includes a part tree or another data structure to organize and associate the features in a parent-child relationship between different features and/or part files. Each feature can be applied to one or more base features which together comprise the component design. Although the teachings of this disclosure refer primarily to featured-based CAx tools or systems, it should be appreciated that other CAx tools, systems or environments can benefit from the teachings herein, including geometrical-based CAD models.

The term "feature type" is defined as a geometric or non-geometric operation, or a result of such operation, available in a CAx tool to characterize a component design. The various feature types can be stored in one or more software libraries as one or more data classes which can be instantiated by the CAx tool.

The term "feature" refers to an instance of a feature type, which can include one or more software commands, or a result of its operation (such as a geometric object). Each feature is represented by a data set and has one or more parameters or attributes, such as a unique feature identifier, a feature type, a relative or absolute spatial position or orientation, body type such as a wireframe or solid, and/or its hierarchical relation to other features in a part tree, for example.

Some geometric feature types include two-dimensional sketches comprised of one or more one-dimensional geometries, such as points, lines or curves, and two-dimensional geometries such as rectangles or ellipses. A sketch, in some instances, provides a rough approximation of the desired dimensioning of the various aspects of a component design. In yet other embodiments, the feature types include various operations to create or modify solid(s) or other three-dimensional geometry such as wireframes, from one or two dimensional features. These various feature types include extrude(s), revolve(s), loft(s), sweep(s), chamfer(s), boundaries, and meshes, for example. The feature types can include operations such as a Boolean operation to add or subtract one feature from another feature, a mirror or a pattern operation to replicate at least one other feature, and an edge blend operation.

Various non-geometric feature types are contemplated including datum such as point(s), plane(s), axes, and coordinate system(s) utilized to arrange or orient other features, and in some instances may not comprise a final design of the component. Other non-geometric feature types can be used to further characterize a base feature comprising a component design, such as surface shading and coloring, material composition and dimensions. Of course, many other feature types utilized to create and further define the various aspects of a component design are contemplated within the teachings of this disclosure.

These various feature types and corresponding features typically have different levels of relevance to various disciplines involved in the collaboration of a component design. Each feature type and feature can also have different levels of applicability with respect to artifacts of the design process, including two-dimensional drawings such as schematics, engineering drawings or blueprints, wireframe models, surface models, and solid models, and also as inputs to other CAx tools such as finite element analysis (FEA) and computational fluid dynamics (CFD) models.

In some embodiments, the CAx environment 112 is configured to designate one or more features or feature types as a layer. Example layers include sketches, wireframes and solids, which in some embodiments are provided by the CAx software as default layer(s). In other embodiments, a user manually selects feature(s) and/or feature type(s) to be associated with at least one custom layer. In some embodiments, each layer is defined at system initialization, and in other embodiments, each layer is defined during operation. Each layer is utilized to filter the selected features or feature types in a part file loaded into the CAx environment.

Multiple users each provided with a CAx environment 112 via the client computers 104 are able to simultaneously access each part file stored in the database 109 and are able to make modifications to various aspects of a component design corresponding to one or more part files. In some embodiments, the part file is stored locally at the storage system 108, with local copies of the part file at the client computers 104 being synchronized periodically. Modifications to each part file are communicated to each CAx environment currently accessing the part file, either in real-time or periodically utilizing a synchronization scheme. Display or visualization of the modification is therefore made substantially immediately available in CAx environments accessing the same part file, which can assist the multiple users in identifying conflicts or inconsistencies in various aspects of a component design, thereby ensuring that a particular design intent is met.

In some situations, the multiple users who use a CAx environment 112 are assigned with different level(s) of access to the component design via a user profile. For example, the component design, or various aspects of the component design including the feature(s) or feature type(s), can be associated with one or more of the level(s) of access. In some embodiments, different levels of access are designated for users that are restricted from access due to export controls, security classification or proprietary restrictions. Other restricted and unrestricted levels of access are contemplated in this disclosure, including job disciplines and organization structures, for example. Accordingly, it may be desirable to limit the visualization of a particular aspect of a component design depending on the level(s) of access provided to a particular user profile. Each user profile corresponds to one or more access lists setting the level(s) of access for each user profile.

Figure 2A:
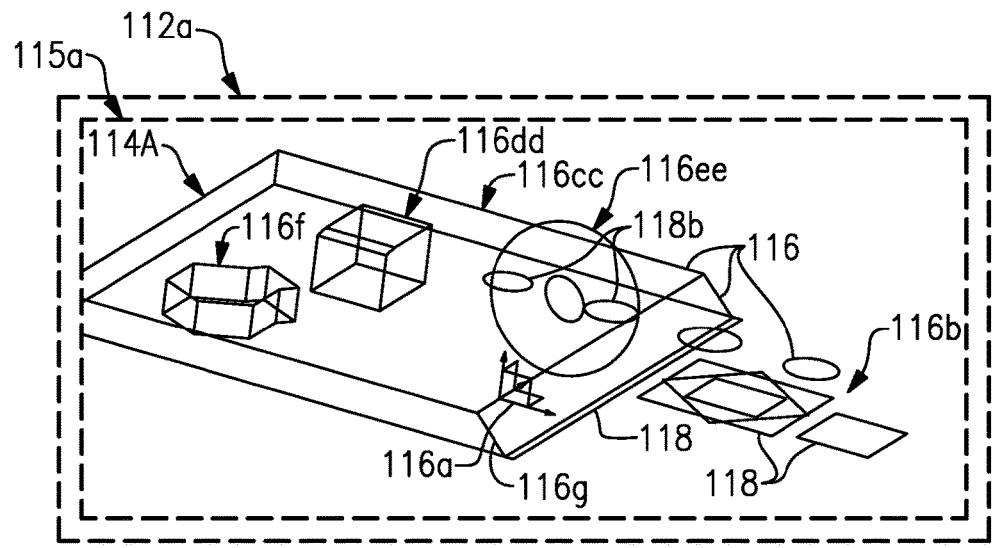
FIG. 2A illustrates a sample component design displayed in a first CAx environment, according to an embodiment.
Figure 2B:
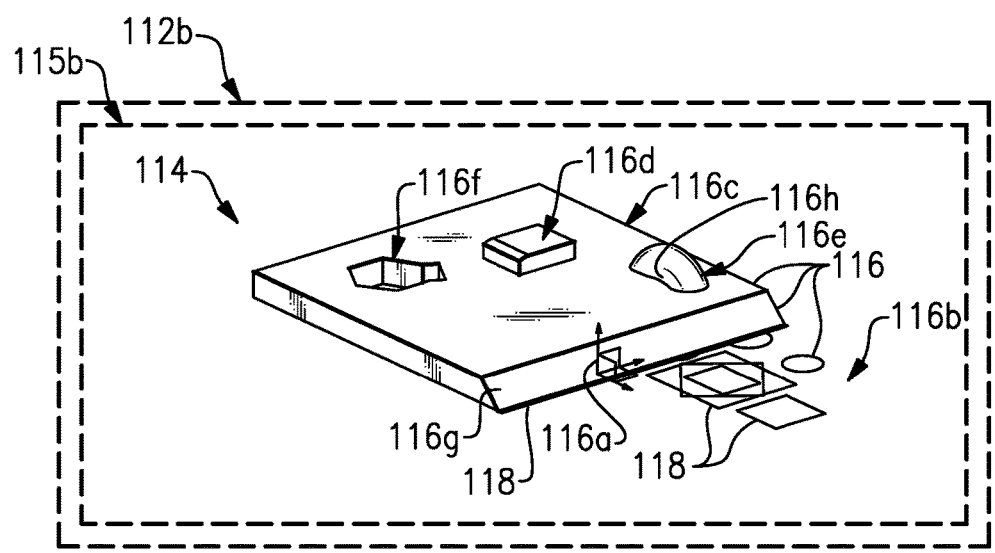
FIG. 2B illustrates the sample component design of FIG. 2A displayed in a second CAx environment, according to an embodiment.

FIGS. 2A-2B illustrate one embodiment in which two users collaborate on various aspects of a component design 114. In this embodiment, a first user is provided with a first CAx environment 112a, and a second user is provided with a second CAx environment 112b, shown in FIGS. 2A-2B respectively. Each of the CAx environments 112a, 112b is associated with a different one of the client computers 104, for example.

The example component design 114 includes one or more features 116 each corresponding to a feature type. The features 116 shown in FIG. 2A include a datum coordinate system 116a, and a sketch 116b having one or more sketch entities or geometries 118 illustrated as ellipses and rectangles, for example. Some features 116 shown in FIG. 2B include solids such as extrudes 116c, 116d, which are applied to geometries 118 of the sketch 116b and are characterized by wireframes 116cc, 116dd shown in FIG. 2A. Other example features include a hole or Boolean 116f forming an opening in the extrude 116c, and a chamfer 116g applied to extrude 116c. Non-geometric features include surface shading 116h (shown in FIG. 2B) applied to the rotate 116e feature.

Each of the multiple users is able to select one or more visualization settings to characterize the display of the component design 114 in a viewing frustum 115 provided by a CAx environment 112 based on the particular situation, as illustrated in FIGS. 2A-2B. For the purposes of this disclosure, the term "visualization setting" means data corresponding to one or more features, feature types, layers or other parameters which can be utilized to display a component design 114 in a CAx environment 112. The term "viewing frustum" refers to a region of modeling space in a window of the CAx environment 112 modeling the component design 114 that characterizes the display of a model or component design 114, in a graphical user interface (GUI) for example. The viewing frustum is characterized by the spatial position and/or orientation of the component design 114 in the modeling space. The CAx environment 112 displays selected portions of the component design 114 stored in one or more part files based on these visualization setting(s). Accordingly, modifications or updates made by other user(s) to the component design may not be displayed in the CAx environment 112.

FIGS. 2A and 2B illustrate different visualization settings for CAx environments 112a, 112b. As illustrated by the CAx environment 112a in FIG. 2A, the user has selected one or more visualization settings to show the wireframe geometries 116cc, 116dd, 116ee and to hide the corresponding solid features 116c, 116d, 116e. In the CAx environment 112b shown in FIG. 2B, the user has selected one or more visualization settings to show solid features 116c, 116d, 116e and to hide wireframes 116c, 116d, 116f, for example. The visualization settings of each CAx environment 112 can be customized according to the needs of a particular situation even though each of the users is working on the same component design 114.

Figure 3:
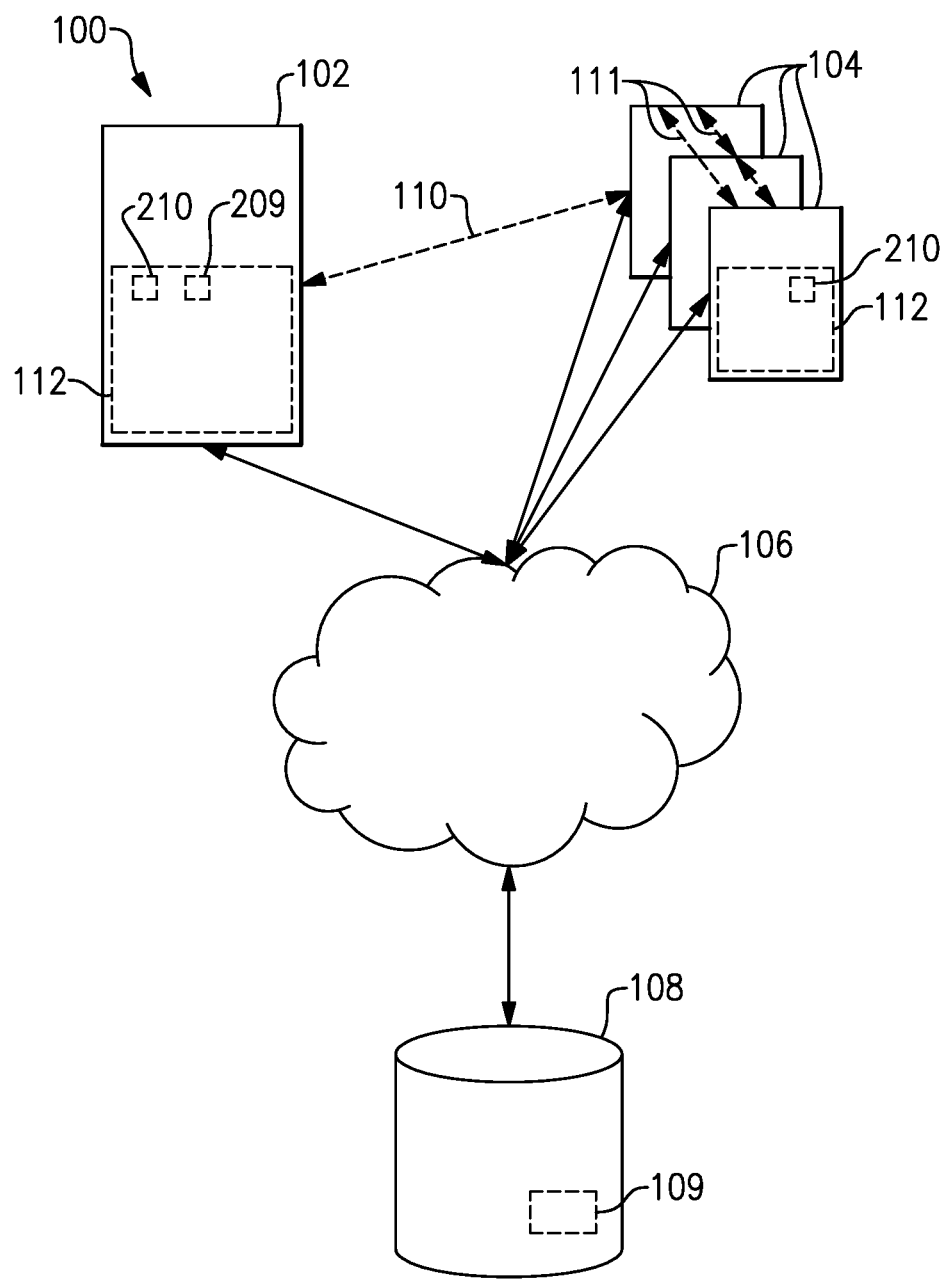
FIG. 3 schematically illustrates an example system for a multi-user CAx environment, according to another embodiment.

With continued reference to FIG. 1, and with like numerals indicating like elements, FIG. 3 schematically illustrates a system for operating a multi-user CAx environment 112, according to an embodiment. The example embodiment of FIG. 3 includes a deletion prevention module 210 within the multi-user CAx environment 112. During operation of the multi-user CAx systems 100, different local environments 112 access and operate on different features of a given part file at any one time. In order to properly maintain the part file, the host computer 102 includes a feature tracking module 209. The feature tracking module includes a chronological list every feature that makes up the part file. This chronological list is referred to as a feature list. Each feature within the feature list includes a timestamp, placing the features in an ordered position on the feature list. In alternative examples, other means of ordering the features within the feature list, distinct from a time stamp, can be used to the same effect.

In order for a user at one of the local CAx environments 112 to access and operate on a given feature, other than the most current feature, a local copy of the feature list is made at the local computer 104 operating the local CAx environment 112. The feature being accessed is referred to herein as the "prior feature". The copy of the feature list at the local computer (the local copy) is reverted to the prior feature. The reversion of the local copy of the feature list includes removal/reversal of all features after the prior feature being accessed by the local CAx environment 112. This results in a local copy of the feature list that is different from the feature list stored at the host computer 102.

When another local user, operating on a later feature in the feature list requests an action, or an operation, that will delete the prior feature that is being accessed by the first user, the deletion can cause the local CAx environment 112 of the first user to crash due to the local CAx environment 112 accessing a non-existent feature.

In order to prevent such an occurrence, the multi-user CAx environment 112 on the host computer 102 includes a deletion prevention module 210. When a user at one of the local environments 112 requests an operation that would delete any prior feature being accessed by one of the other local CAx environments 112, the deletion prevention module 210 stops the operation from occurring. This is achieved by monitoring incoming operation requests from each local CAx environment 112, and comparing each request against a list of features currently being accessed by all local CAx environments 112. When a requested operation would delete a prior feature being accessed (i.e. a feature on the list of features currently being accessed), the deletion prevention module 210 causes the host CAx environment 112 to prevent that operation. In a thin client environment, the deletion prevention module 210 operates primarily in the CAx environment 112 of the host computer 102. In contrast, a thick client environment can operate the deletion prevention module 210 in either the local CAx environment 112 or the host CAx environment 112.

In some alternate examples the host computer 102 does not maintain a specific list of each feature being accessed by a local CAx environment 112, and the deletion prevention module 210 polls, or otherwise checks, each currently connected local computer 104 to see what feature is currently being accessed when an operation that would delete a feature is requested. The polling or checking can be accomplished using any known method of computer communication and can either be facilitated via the deletion prevention module 210 within the host computer 102 or via the deletion prevention modules 210 within each of the local computers 104 depending on the configuration of the particular system.

In some examples, the deletion prevention module 210 provides a prompt in one or more of the local CAx environments 112 indicating that an operation has been prevented due to another local user accessing the prior feature. In some further examples, the prompt can include an override option, allowing one or more of the local users being prompted to override the deletion prevention module 210, and proceed with deleting the prior feature being accessed by the other local user.

In example embodiments including the override option, the prompt provided to the user accessing the prior feature can allow the user to accept deletion or alteration of the prior feature. In response to the prompt, the user using the local CAx environment 112 that is accessing the prior feature can either allow the deletion or not allow the deletion. If the user accessing the prior feature allows the deletion, the local CAx environment 112 accesses a chronologically earlier feature on the feature list than the currently accessed prior feature, reverts the local copy of the feature list to the new prior feature and the deletion prevention module 210 allows the previous prior feature to be deleted. By way of example, the user may allow such a deletion when the feature being accessed by the local CAx environment 112 is not being directly used by the user.

Figure 4:
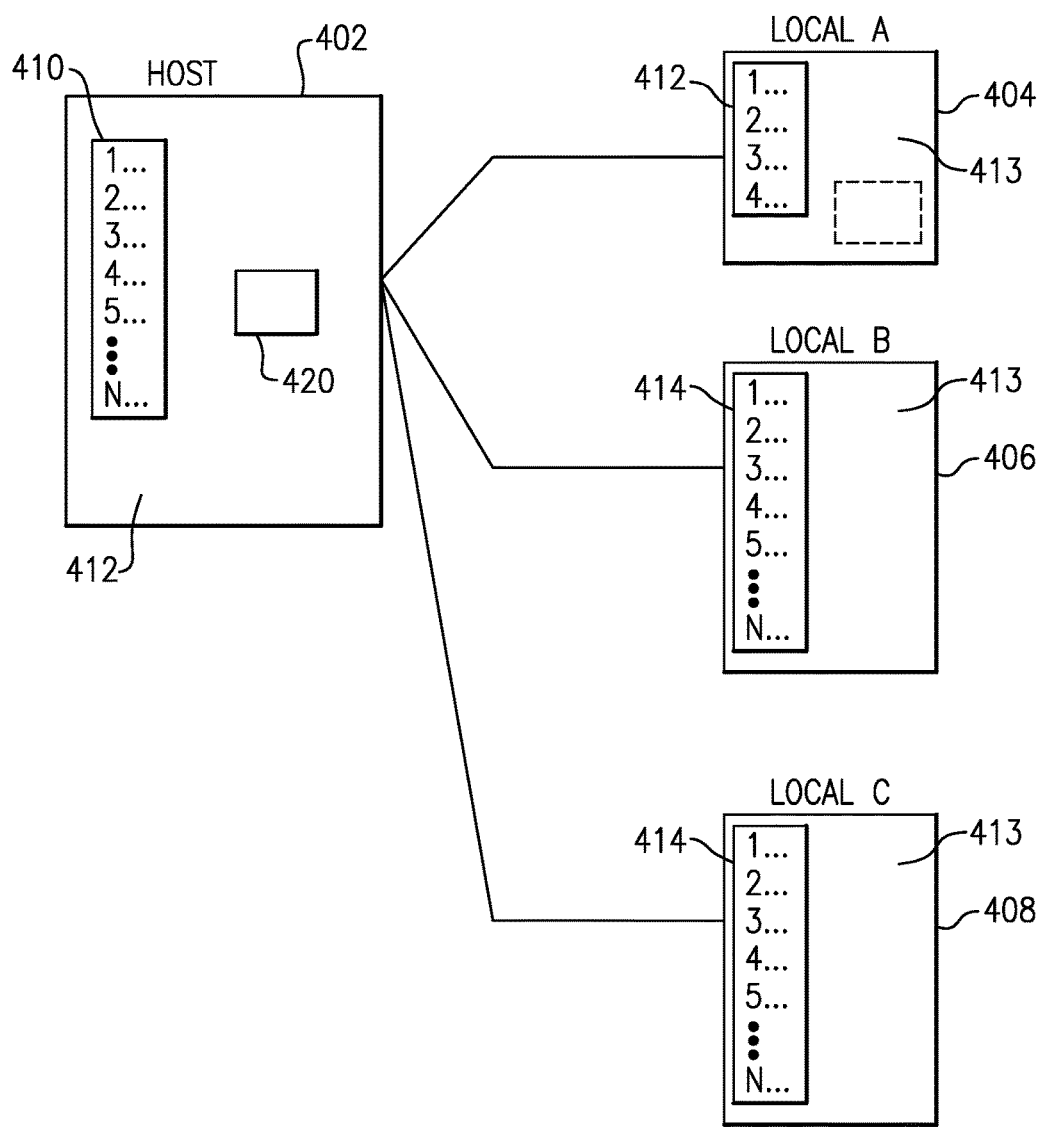
FIG. 4 schematically illustrates a feature list operation of the multi-user CAx environment of FIG. 3.

With continued reference to FIGS. 1-3, FIG. 4 illustrates an example feature list 410, and provides an example operation according to the above description. In the example of FIG. 4, the host computer 402 is operating a multi-user CAx environment 412 that includes a host feature list 410. The host feature list 410 includes any number (N) of features, arranged in an ordered fashion. As described above, in one example the ordering of the feature list 410 is accomplished via a timestamp applied to each feature in the feature list.

Each of three local computers (Local A 404, Local B 406, and Local C 408) are operating a local multi-user CAx environment 413 within the multi-user CAx environment of the host computer 402. In some examples, each local computer 404, 406, 408 can operate the same CAx package. In alternative examples the CAx packages being operated by the local computers 404, 406, 408 can be distinct software packages.

Local A 404 is accessing feature 4 on the feature list 410, and has a local feature list 412 that is reverted to only include Feature 4, and each feature prior to feature 4 on the feature list 410. As such feature 4 is referred to as the "prior feature". Each of Local B 406 and Local C 408 are accessing the most recent feature, feature N, and their local feature lists 414 are identical to the host feature list 410. While the exemplary embodiment illustrates only three local computers 404, 406, 408, and only one prior feature, feature 4, being accessed by a local computer 404, one of skill in the art having the benefit of this disclosure will understand that any number of local computers can be utilized, and any number of prior features can be accessed concurrently by the local computers in a practical example.

Due to the distinct feature list 412 at local A 404, an operation originating from one of the other local computers 406, 408 can cause the feature currently being accessed by Local A 404 (Feature 4) to be deleted. When such an operation is requested, absent a deletion blocker module, the feature would be removed from the host feature list 410, and then from each feature list of the local computers 404, 406, 408 when the local computers sync with the host computer.

Local A, however, is currently accessing the prior feature 4, and deletion or alteration of the prior feature 4 will cause local A 404 to crash when the local CAx environment 413 attempts to sync with the host CAx environment 412. In order to prevent this crash, as described above, a deletion prevention module 420 prevents deletion of any feature that is currently being accessed by a local computer 404, 406, 408.

In examples utilizing the above described override feature, the deletion prevention module 420 causes the host computer 402 to display a prompt in the local CAx environment 413 of Local A 404. The prompt informs the user of the local CAx environment 413 that another user has requested deletion of the feature they are currently accessing. If the user at local A 404 can continue operations by accessing a different feature, the user can accept the override, and allow the operation requested by the other user to proceed. In such a case, the local CAx environment 413 of local A 404 reverts to another previous feature, and allows the user to continue operating with the local CAx environment 112.

Figure 5:
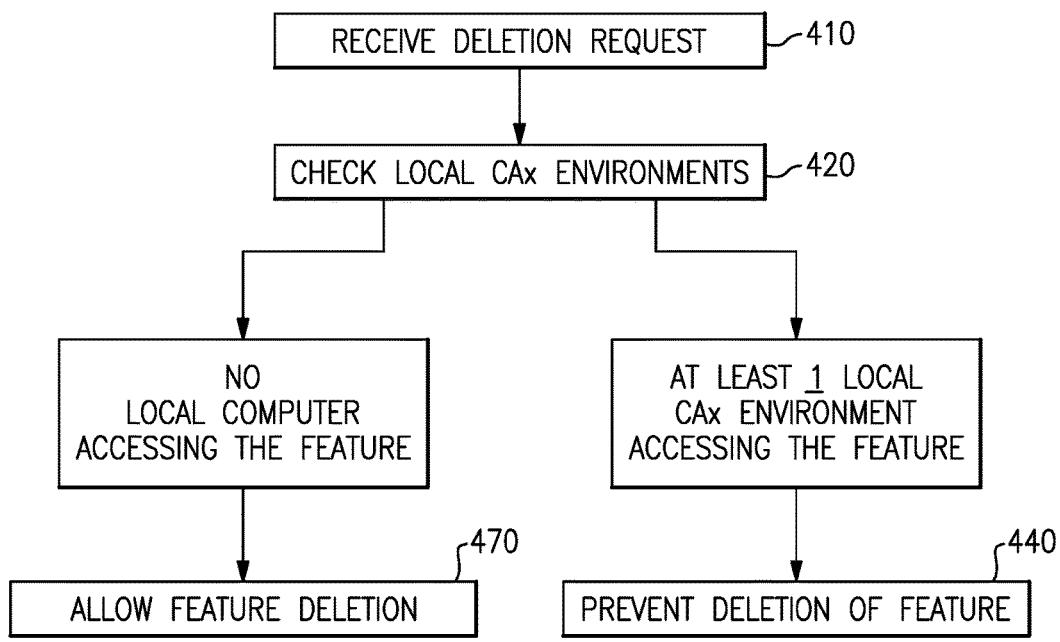
FIG. 5 illustrates an example method of operating a deletion prevention module.

By way of further example, FIG. 5 is a flow chart 500 demonstrating the method for the operations of the deletion prevention module 210, 420. Initially, the deletion prevention module 210, 420 receives a feature deletion request in a "Receive Deletion Request" step 410.

Upon receipt of the feature deletion request, the deletion prevention module 210, 420 determines which feature is being requested to be deleted, and checks to see if any other local CAx environments is currently accessing that feature in a "Check Local CAx Environments" step 420. In some embodiments, this check is achieved by comparing the requested feature against a master list of all features currently being accessed by any local CAx environment. Such a list is stored within the CAx environment of the host computer. In alternative embodiments the check is achieved by polling each local computer to determine what feature is currently being accessed.

If no local CAx environment is accessing the feature, the deletion prevention module allows the deletion in an "Allow Feature Deletion" step 430. If at least one local CAx environment is accessing the feature, the deletion prevention module prevents the feature from being deleted in a "Prevent Deletion of the Feature" step 440. In some examples, an override prompt, allowing the user accessing the prior feature to approve of the deletion as described above, is provided in this step as well.

While described above in general terms, and applied to a general multi-user CAx system, one of skill in the art will understand that the concepts can be applied equally to a thin client or thick client environment. Similarly, the deletion prevention modules can be included within the local CAx environments or the host CAx environments with minimal structural differences, and both examples fall within the above disclosure.

Furthermore, the foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A system for executing agnostic multi-user CAx environments comprising:
    a host computer including a processor and a memory, the processor and memory configured to operate a multi-user CAx environment;
    said host computer configured to communicate with a plurality of local computers, each of said local computers including at least one CAx software package and configured to operate a local CAx environment of said multi-user CAx environment;
    a feature list stored within the memory of the host computer, the feature list including a list of each feature of a part file; and
    a deletion prevention module stored within at least one of the memory of the host computer and a memory of each of the local computers, the deletion prevention module configured to prevent deletion of a prior feature currently accessed by at least one local CAx environment, wherein the deletion prevention module is configured to cause the host computer to poll each local CAx environment and determine a currently active feature in each of said local CAx environments in response to a feature deletion request.

2. The system of claim 1, wherein the prior feature is a feature accessed in at least one of said local CAx environments.

3. A system for executing agnostic multi-user CAx environments comprising:
    a host computer including a processor and a memory, the processor and memory configured to operate a multi-user CAx environment;
    said host computer configured to communicate with a plurality of local computers, each of said local computers including at least one CAx software package and configured to operate a local CAx environment of said multi-user CAx environment;

a feature list stored within the memory of the host computer, the feature list including a list of each feature of a part file; and a deletion prevention module stored within at least one of the memory of the host computer and a memory of each of the local computers, the deletion prevention module configured to prevent deletion of a prior feature currently accessed by at least one local CAx environment wherein the deletion prevention module includes a list of each feature currently accessed by one of said local computers, and wherein the host computer is configured to prevent any deletion of a feature on said list.

4. The system of claim 1, wherein the feature deletion prevention module is further configured to cause the host computer to prevent deletion of any currently active feature.

5. The system of claim 1, wherein the deletion prevention module is further configured to prompt each local CAx environment accessing the prior feature in response to the feature deletion request.

6. The system of claim 5, wherein the prompt includes an option for a local user accessing the prior feature to allow the prior feature to be deleted.

7. The system of claim 6, wherein the local CAx environment of the local user is configured to cause the local CAx environment to change an accessed feature to a feature having an earlier time stamp than the prior feature in response to said local user allowing the prior feature to be deleted.

8. The system of claim 1, wherein a feature is defined as at least one of a geometric operation, a non-geometric operation, a result of a geometric operation, and a result of a non-geometric operation.

9. The system of claim 1, wherein the feature list is a chronologically ordered list, and wherein each feature includes a timestamp.

10. A method for preventing system instability in a multi-user CAx system comprising:

receiving a requested operation at a deletion prevention module, the requested operation including a requested deletion of at least one feature of an ordered feature list of a CAx part file;

determining if the at least one feature of a CAx part file is currently accessed by at least one local CAx environment; and the deletion prevention module preventing the requested operation in response to determining that at least one local CAx environment is accessing the at least one feature.

11. The method of claim 10, wherein determining if the at least one feature of the CAx part file is currently accessed by at least one local CAx environment comprises comparing the at least one feature against a list of features currently being accessed, the list of features currently being accessed being stored in a host computer CAx environment.

12. The method of claim 10, wherein determining if the at least one feature of the CAx part file is currently accessed by at least one local CAx environment comprises a host CAx environment polling each connected local CAx environment and comparing the at least one feature against a feature currently being accessed by each at least one local CAx environment.

13. The method of claim 10, wherein the requested deletion of at least one feature of a CAx part file is a requested deletion of a feature off a feature list, and wherein the feature list is an ordered list of geometric operations, non-geometric operations, results of geometric operations, and results of a non-geometric operations.

14. The method of claim 10, further comprising prompting a user accessing the at least one feature in response to determining that the at least one feature of a CAx part file is currently accessed by at least one local CAx environment, wherein the prompt includes at least information identifying the requested operation.

15. The method of claim 14, wherein the prompt further includes an override option, and wherein the deletion prevention module allows deletion of the at least one feature in response to an override authorization.

16. The method of claim 15, wherein the local CAx environment accessing the at least one feature reverts to a feature of the ordered feature list earlier than the at least one feature in response to the override authorization, thereby allowing deletion of the at least one feature.

* * * * *